United States Patent [19]

Föhl

[11] Patent Number: 4,810,005
[45] Date of Patent: Mar. 7, 1989

[54] GAS CUSHION IMPACT PROTECTION DEVICE FOR MOTOR VEHICLES

[75] Inventor: Artur Föhl, Schorndorf, Fed. Rep. of Germany

[73] Assignee: TRW Repa GmbH, Schorndorf, Fed. Rep. of Germany

[21] Appl. No.: 74,564

[22] Filed: Jul. 17, 1987

[30] Foreign Application Priority Data

Jul. 22, 1986 [DE] Fed. Rep. of Germany ....... 3624744

[51] Int. Cl.$^4$ ............................................. B60R 21/22
[52] U.S. Cl. ..................... 280/732; 280/735
[58] Field of Search ............. 280/728, 734, 735, 743, 280/730, 731, 736, 740; 220/85 B; 383/3, 907

[56] References Cited

U.S. PATENT DOCUMENTS

| | | | |
|---|---|---|---|
| 2,850,291 | 9/1958 | Ziccardi | 280/735 |
| 3,043,465 | 7/1962 | Horner | 220/85 B |
| 3,532,358 | 10/1970 | Selwa et al. | |
| 3,532,359 | 10/1970 | Teague et al. | |
| 3,768,824 | 10/1973 | Kloppe et al. | |
| 3,895,823 | 7/1975 | Stephenson | 280/740 |
| 3,972,545 | 8/1976 | Kirchoff et al. | 280/736 |
| 4,111,457 | 9/1978 | Kob et al. | 280/728 |
| 4,136,894 | 1/1979 | Ono et al. | |
| 4,148,503 | 4/1979 | Shiratori et al. | |
| 4,400,010 | 8/1983 | Stütz et al. | 280/728 |
| 4,759,568 | 7/1988 | Paefgen et al. | 280/732 |

FOREIGN PATENT DOCUMENTS

| | | |
|---|---|---|
| 2225173 | 12/1972 | Fed. Rep. of Germany . |
| 2600426 | 7/1976 | Fed. Rep. of Germany . |
| 2755649 | 6/1978 | Fed. Rep. of Germany . |
| 7438377 | 10/1979 | Fed. Rep. of Germany . |
| 2915202 | 10/1980 | Fed. Rep. of Germany . |
| 2185982 | 1/1974 | France . |

Primary Examiner—David M. Mitchell
Assistant Examiner—Karin L. Ferriter
Attorney, Agent, or Firm—Tarolli, Sundheim & Covell

[57] ABSTRACT

The bottom wall (12) of a rectangular housing (10) comprises a trough-like depression (14) which is sealed on the inside of the housing (10) by a cover (22) provided with a securing flange (22A). A propellant charge (42) is introduced into the trough-like depression (14). The housing (10) is sealed at its front side by a covering formed by two pivotal foamed material plates (30, 32). In the interior of the housing (10) a folded gas bag (26) is accommodated which is inflated by the gases forming on combustion of the propellant charge (42) and flowing through gas passage openings of the cover (22) into the interior of the gas bag (26). Since the propellant charge (42) can be introduced directly or using a simple capsule housing of plastic into the interior of the trough (14) a separate and involved gas generator housing can be dispensed with.

7 Claims, 2 Drawing Sheets

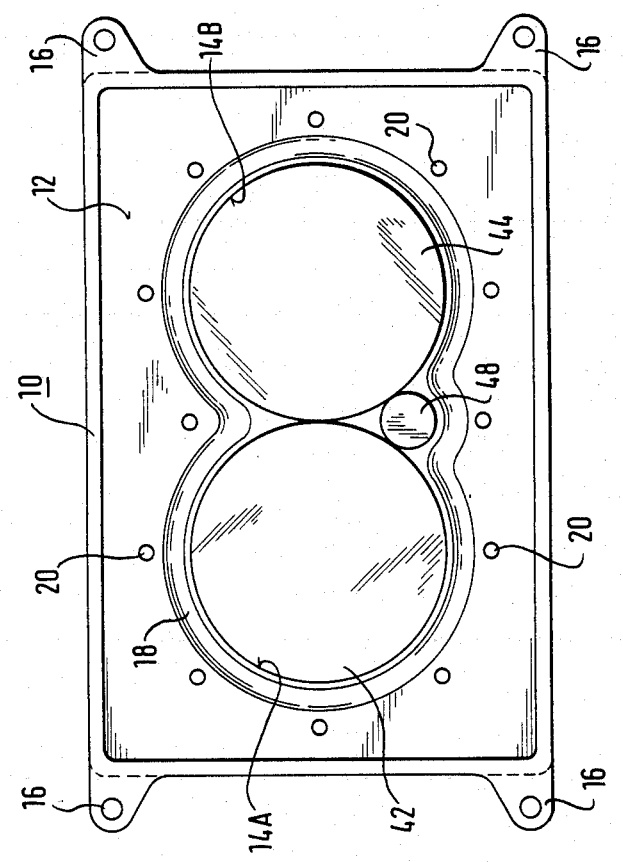

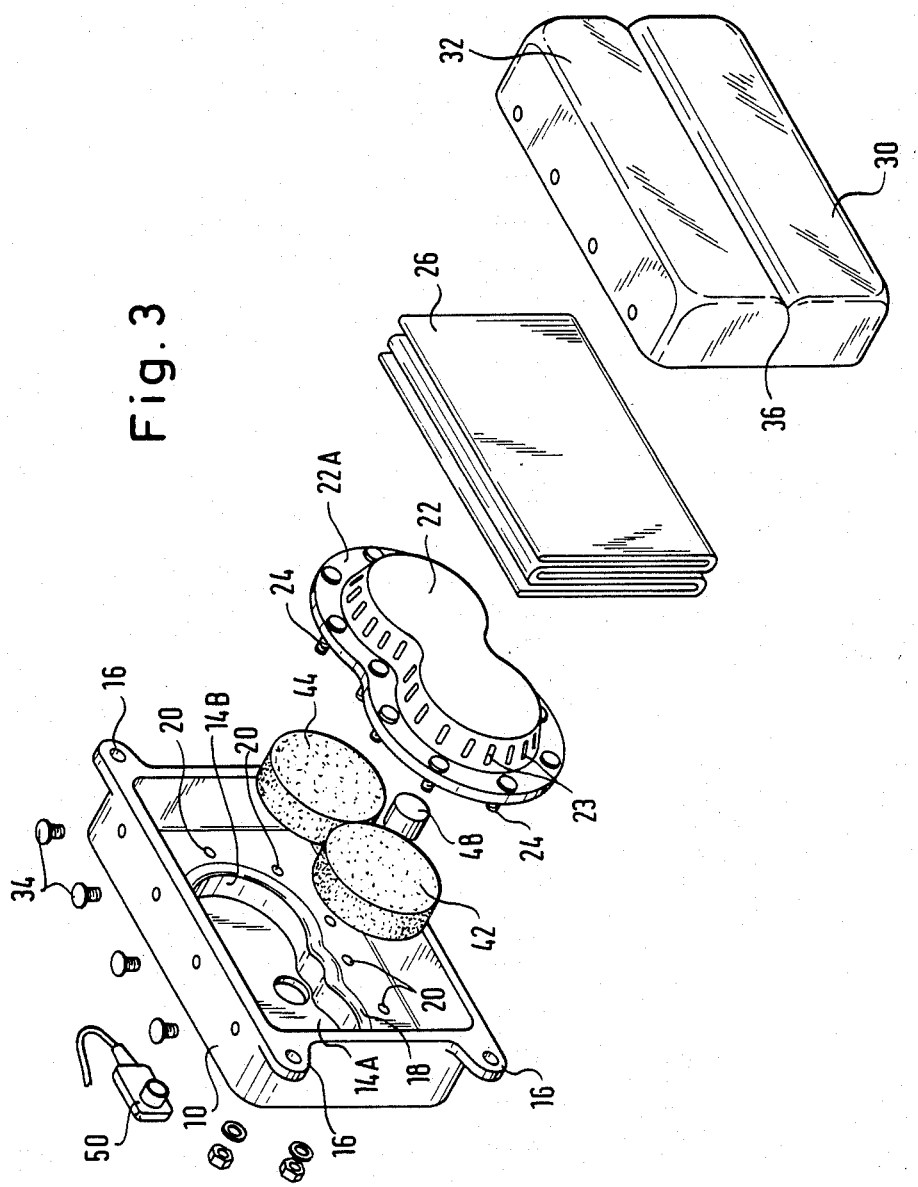

GAS CUSHION IMPACT PROTECTION DEVICE FOR MOTOR VEHICLES

The invention relates to improvements in a gas cushion impact protection device for motor vehicles.

For some time, gas cushion collision or impact protection devices have been used not only on the driver's side, where they are generally integrated in the steering wheel, but also on the front passenger side. They include a gas generator with a propellent charge and an electrical igniter or fuse which is triggered via a trigger circuit by the signals furnished by a deceleration sensor. The gases generated by the gas generator blow up an inflatable gas bag which is accommodated with the gas generator in a housing. The housing is closed on the exit side of the gas bag by a removable cover.

In conventional gas cushion impact protection devices for the front passenger side, which fundamentally are also suitable for the rear seats of a motor vehicle, the gas generator comprises a separate housing which consists of a dish-shaped housing bottom and a housing cover connected thereto at its edge, said cover being provided with gas passage openings. In the interior of the gas generator housing the propellent charge with the fuse is accommodated. Two such gas generators can be arranged adjacent each other and connected in parallel to supply a gas bag larger than that on the driver's side with gases. These separate gas generator housings are then incorporated into a generally rectangular housing which apart from the gas generators also accommodates the folded gas bag. The separate gas generator housings are made by means of complicated production techniques from high-strength materials because they must withstand the high pressures occurring when the propellent charge fires. They are therefore very expensive. Due to the high strength requirements and the critical handling of suitable propellent charges however hitherto dispensing with separate gas generator housings was not considered.

The present invention provides a simplified structure and production of gas cushion impact protection devices of the aforementioned type.

In the gas cushion impact protection device of the invention, the bottom of the housing is provided with a trough-shaped depression in which the propellent charge and the fuse of the gas generator are arranged, and the trough-shaped depression is closed by a cover having gas passage openings.

The invention proceeds from the recognition that for a gas cushion impact protection device of the type in question a box-like housing of high strength is necessary in any case. For even when using separate gas generator housings this housing is still subjected to extreme mechanical stresses because when the gas bag is inflated high impact stresses occur in opposite directions at the anchoring points between the box-shaped housing and the vehicle bodywork. The bottom of this housing thus has adequate strength to enable a trough-like depression to be formed therein which then becomes part of the gas generator housing. A separate gas generator housing can therfore be dispensed with. This provides a considerable simplification and costs saving as regards structure and production of the gas cushion impact protection devices.

According to an advantageous further feature of the invention the cover comprises a mounting flange which engages over the edge of the trough-like depression and by which the cover is secured to the bottom face of the housing. The securing of the cover to the bottom face of the housing can thus be effected simply by means of screws or rivets. It is particularly advantageous when in accordance with a further development of the invention the clamping edge of the gas bag defining the inflation opening of said bag is clamped between the securing flange of the cover and the bottom face of the housing.

A particularly reliable anchoring and sealing of the gas bag is achieved by the trough-like depression of the housing bottom being surrounded by an encircling groove into which a bead defining the clamping edge of the gas bag is inserted.

According to an advantageous further development the propellent charge is inserted into the trough-like depression of the housing bottom as hermetically sealed construction unit combined with the fuse. It is then not necessary to take any particular precautions to prevent penetration of moisture and impurities into the propellent charge.

According to a further embodiment however the propellent charge can be introduced directly into the trough-like depression. This eliminates the expenditure for a separate capsule housing of the propellent charge.

A particularly expedient embodiment resides in that the propellent charge is divided into two individual charges which are disposed in the trough-like depression adjacent each other. The fuse or igniter is then preferably arranged between the two adjacent individual charges. The use of two individual charges is more favourable than the use of a single correspondingly larger dimensioned charge in so far as the housing is formed generally rectangular corresponding to the mounting space available on the passenger's side and this mounting space can be excellently utilized by two circular disc-shaped individual charges. Furthermore, particularly favourable load conditions are obtained if the trough-like depression is made generally 8-shaped in plan view.

Further advantages and features of the invention will be apparent from the following description of examples of embodiment and the drawings, to which reference is made.

In the drawings:

FIG. 1 is a schematic cross-section of an embodiment of the gas cushion impact protection device for the front passenger's side;

FIG. 2 is a plan view of the housing of the device shown in FIG. 1, the covering, gas bag and cover being removed;

FIG. 3 is an exploded view of the same embodiment.

A generally right parallelpipedic housing 10 comprises in its bottom wall 12 is trough-like depression 14. In plan view (FIG. 2) this trough-like depression is 8-shaped and consists of two contiguous circular troughs 14A, 14B. The housing 10 comprises at its four corners laterally projecting securing lugs 16. The 8-shaped depression formed by the troughs 14A, 14B is surrounded by an encircling groove 18 which is also 8-shaped. Disposed round the outer periphery of the groove 18 are bores 20 which lead through the wall thickness of the bottom wall 12. These bores 20 serve to secure a cover 22 by means of threaded bolts or rivets 24 which are inserted through the bores 20 and bores aligning therewith in a securing flange 22A of the cover 22. The cover 22 is outwardly arched and provided with gas passage openings 23. Between the securing flange 22A and the bottom 12 of the housing 10 the reinforeced clamping edge of an inflatable gas bag 26 is clamped. This clamping edge of the gas bag 26 is provided with openings for the passage of the threaded bolts or rivets 24 and terminates in a bead 28 which is inserted into the groove 28. The front side of the housing 10 is sealed by a covering which consists of two rectangular foamed material plates 30, 32 which are secured at their outer edge via a flexible material strip 30A and 32A respectively by means of securing screws 34 to the side wall of the housing 10 and at their inner edge are connected by a severable connection 36. The foamed material plates 30, 32 are reinforced by a sheet metal insert 38 and 40 respectively.

The gas bag 26 is stowed in the folded state in the interior space present between the housing 10 and the covering formed by the foamed material plates 30, 32.

A propellent charge 42, 44 is introduced into each trough 14A, 14B. The propellent chares 42, 44 are disc-shaped and fill out the corresponding trough 14A, 14B. A filter 46 is inserted in the cavity formed by the arching of the cover 22. The propellent charges 42, 44 each form a construction unit enclosed hermetically in a capsule housing of plastic. Between these two contiguous construction units an electrical fuse 48 is disposed. This electrical fuse 48 is so dimensioned that it can ignite both propellant charges 42, 44 simultaneously through their capsule housings. The propellent charge itself may be pulverulent, pellet-form or the like.

According to another embodiment the propellent charge is introduced into the troughs 14A, 14B directly, i.e. without using capsule housing. Suitable precautions must then be taken to prevent penetration of moisture and impurities into the propellent charges. For example, the propellent charges can be covered after introduction by means of a thin plastic sheet.

The electrical fuse 48 is connected via electrical leads led sealingly through the wall of the housing 10 and via a connector 50 to a trigger circuit. When a trigger pulse reaches the electrical fuse 48 the latter fires simultaneously both the propellent charges 42, 44 so that they burn within an extremely short time and generate gases which pass through the gas passage openings 23 into the interior of the folded gas bag 26 and inflate the latter at high pressure, the two foamed material plates 30, 32 thereby being separated from each other and pivoted upwardly so that the inflating gas bag 26 can pass through.

The embodiment illustrated and described in the drawings is particularly suitable for arrangement on the front passenger's side of a motor vehicle. The rectangular form of the housing 10 is particularly suited to this purpose.

I claim:

1. A gas cushion impact protection device for motor vehicles, comprising a gas generator having a propellant charge and a fuse, a gas bag which is inflatable by the gases generated by said gas generator, and a housing, said gas bag and said gas generator being in said housing, said housing being sealed by covering means, said housing having a bottom wall provided with a trough-shaped depression in which said propellant charge and said fuse are arranged, said trough-shaped depression being closed by a cover provided with gas passage openings, said cover having a securing flange which overlies an edge of the trough-shaped depression and by which said cover is secured to the bottom wall of the housing, said gas bag having a clamping edge with a bead defining an inflation opening of said gas bag and clamped between the securing flange of said cover and the bottom wall of the housing, said trough-shaped depression being surrounded by an encircling groove into which said bead is inserted, said propellant charge comprising two individual disc-shaped charges which are disposed adjacent each other in said trough-shaped depression, said trough-shaped depression being generally 8-shaped, said fuse being disposed between said two adjacent individual disc-shaped charges for simultaneously igniting the same.

2. The gas cushion impact protection device according to claim 1, wherein said cover is secured to the housing by means of threaded bolts, rivets or the like which extend through openings in the securing flange and through openings aligned therewith in the bottom wall of the housing.

3. The gas cushion impact protection device according to claim 2, wherein the threaded bolts, rivets or the like further extend through the clamping edge of the gas bag.

4. The gas cushion impact device according to claim 1, wherein each of said two disc-shaped charges is hermetically sealed in a thin-walled capsule housing.

5. The gas cushion impact protection device according to claim 4 wherein said thin-walled capsule housings are made of a plastic material.

6. A gas cushion impact protection device for motor vehicles, said gas cushion impact protection device comprising:
   a gas generator comprising a propellant charge and a fuse for igniting said propellant charge;
   a housing having a bottom wall provided with a trough-shaped depression for receiving said propellant charge and said fuse;
   a cover for closing said trough-shaped depression and having gas passage openings therethrough, said cover having a flange overlying said bottom wall adjacent said trough-shaped depression; and
   a gas bag located in said housing, said gas bag having an edge clamped between said flange of said cover and said bottom wall; and
   covering means for sealing said housing;
   said propellant charge comprising two disc-shaped charges, said trough-shaped depression being 8-shaped and comprising two contiguous circular troughs for receiving said two disc-shaped charges, and said fuse being located between said two disc-shaped charges for simultaneously igniting the same.

7. The gas cushion impact protection device according to claim 6 further comprising two thin-walled plastic capsule housings for hermetically enclosing said two disc-shaped charges, respectively.

* * * * *